United States Patent [19]

Soteropulos

[11] 4,088,069
[45] May 9, 1978

[54] ELASTIC BALE-FORMING CONVEYOR FOR CYLINDRICAL BALES

[75] Inventor: Gust Soteropulos, Ottumwa, Iowa
[73] Assignee: Deere & Company, Moline, Ill.
[21] Appl. No.: 693,771
[22] Filed: Jun. 8, 1976
[51] Int. Cl.² .................. A01D 39/00; B65H 17/06; B30B 5/06
[52] U.S. Cl. ............................. 100/88; 56/341; 242/DIG. 3; 242/86.5 R
[58] Field of Search ........... 242/55.1, DIG. 3, 86.5 R, 242/86.52, 75.1, 68.7, 78.7, 192; 100/88, 5; 56/341, 342, 343

[56] References Cited

U.S. PATENT DOCUMENTS

| 2,057,191 | 10/1936 | Huffine | 242/55.1 |
| 3,125,311 | 3/1964 | Willis | 242/192 |
| 3,931,702 | 1/1976 | Soteropulos et al. | 100/88 X |
| 3,964,246 | 6/1976 | Kopaska | 100/88 X |

FOREIGN PATENT DOCUMENTS 830,151  3/1960  United Kingdom ............... 100/88

Primary Examiner—Harvey C. Hornsby
Assistant Examiner—John M. Jillions

[57] ABSTRACT

In a mobile machine for forming cylindrical bales, a mat of crop material is picked up from the ground and fed to a baling chamber defined by the generally horizontal upper run of a lower endless belt conveyor and the internal envelope of a plurality of rollers carrying an upper conveyor and disposed immediately above it. The upper conveyor comprises a plurality of elastic endless belts stretched around the rollers and includes a lower run which, at the inception of bale formation, spans the baling chamber between a pair of lower rollers immediately above the chamber floor. The upper and lower conveyors are driven in opposite directions so that as the mat of crop material is fed into the baling chamber, it is rolled, spiral-like, into a cylindrical bale. As the bale increases in diameter, the belts of the upper conveyor, engaging the bale periphery, extend elastically to provide the increase of belt length required to accommodate the bale in the chamber.

4 Claims, 2 Drawing Figures

ELASTIC BALE-FORMING CONVEYOR FOR CYLINDRICAL BALES

BACKGROUND OF THE INVENTION

This invention relates to machines for forming cylindrical bales of crop material such as hay or the like and more particularly to improvements in a bale-forming conveyor of such a machine.

Machines in which a bale is formed between and controlled by a pair of oppositely moving endless belt conveyors or between a belt conveyor and the ground are well known. Typically in these machines, the bale-forming conveyor comprises a plurality of substantially in elastic belts trained around a plurality of rollers and is provided with a belt takeup mechanism which keeps the belts in tension around the bale and, through deflection of the takeup mechanism, provides the extra belt length necessary to accommodate the growing bale.

Belt takeup is only an auxiliary function of the machine but requires significant additions to its structure. Typically, two extra fixed rollers and one floating takeup roller, all extending the full width of the machine, are required. The takeup roller must be carried on support arms and biased by heavy springs and/or ballasted so as to apply the necessary tension to the belts. The frame structure of the machine must be adapted to carry the mechanism and bearings provided for the moving parts. Taken together, the parts of the belt takeup mechanism add considerably to the cost, weight and complexity of the machine.

SUMMARY OF THE INVENTION

Accordingly, it is an object of the present invention to simplify and reduce the cost of a most important part of a cylindrical baler, the bale-forming conveyor, and also to improve the overall appearance of such a machine.

A feature of the present invention is the use of elastic belts in the bale-forming conveyor. The belts have an initial length much shorter than those used in conventional balers, but are capable of elastic extension to at least approximately twice their initial length. In a typical application, the elastic extension of the belts can provide all the change in belt length necessary to engage the periphery of the bale from the inception of its formation until its reaches its full size. All parts peculiar to the belt takeup function in machines using conventional belts and described above are eliminated, greatly reducing the cost and complexity of the machine and making it possible to present an improved appearance uncluttered by the belt takeup mechanism.

DESCRIPTION OF THE PREFERRED EMBODIMENT

The invention is embodied in a baler of the type where a large cylindrical bale is formed off the ground and discharged rearwardly after the bale is fully formed. A machine of the above general type is described in detail in U.S. Pat. No. 3,931,702, which has an assignee common to the present invention, and only a summary of the description of the conventional parts of the embodiment is given here.

The machine includes a mobile main frame indicated generally by the numeral 10 mounted on a pair of wheels 12 at opposite sides of the frame. An implement tongue 14 extends forward from the frame for connection to a pulling vehicle in the conventional manner. The frame also includes a pair of upright fore-and-aft side panels or walls 16 that form the opposite sides of a baling zone or chamber.

Figure 1:
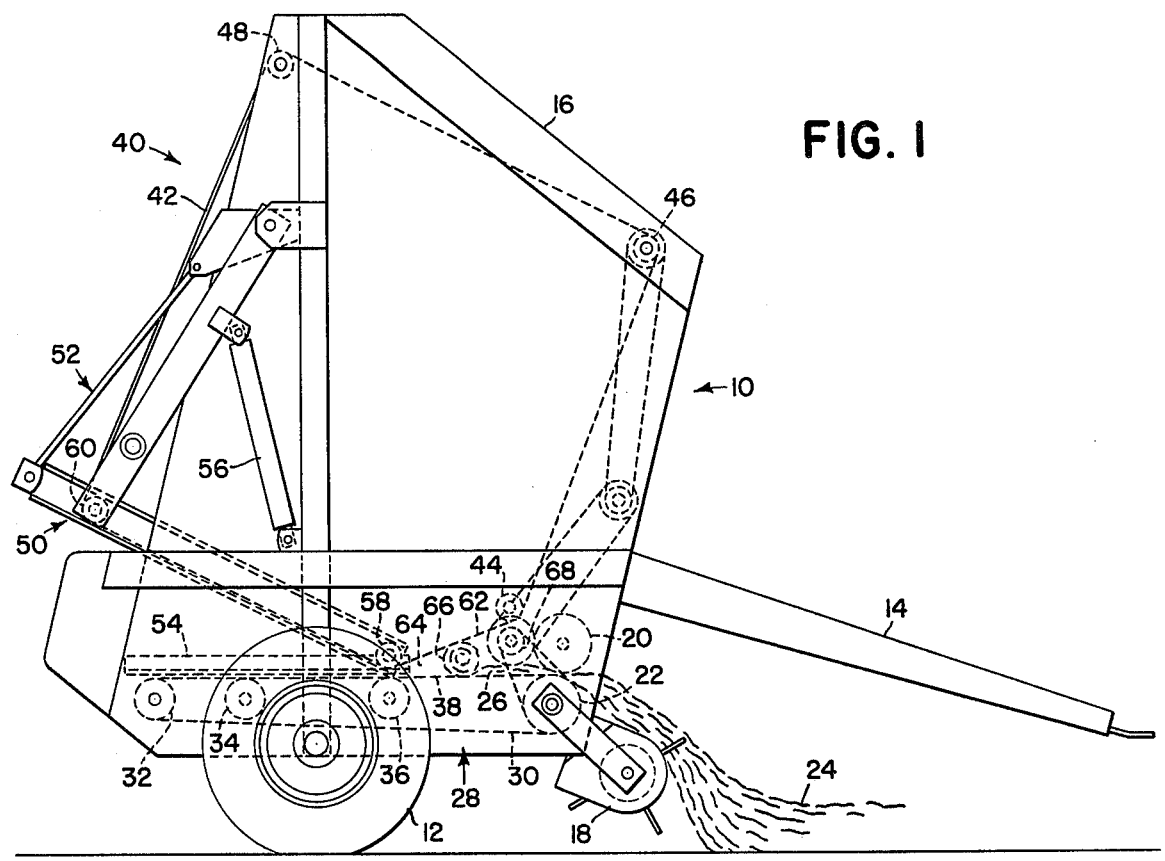
FIG. 1 is a partly schematic side elevation of a machine embodying the invention at the inception of formation of a bale.

A pickup mechanism indicated by the numeral 18 is mounted on the main frame at the front of the machine. A pair of vertically spaced transverse oppositely rotating compressor rolls 20 and 22 extend between the opposite side panels 16 immediately to the rear of the pickup mechanism. As shown in FIG. 1, the pickup mechanism elevates the crop laying in a windrow 24 and delivers it upwardly and rearwardly to the bite of the compressor rolls 20 and 22, which engage the crop and pass it rearwardly between the rolls in a mat 26.

The mat of crop material leaving the compressor rolls is deposited on top of a lower conveyor indicated generally by the numeral 28. The lower conveyor is formed by an endless flexible belt 30, which extends between the opposite side panels 16 and is trained around the lower compressor roll 22 and a rear roller 32, which also extends between the opposite side panels. A pair of intermediate rollers 34 and 36 also extend between the opposite side panels and engage the underside of the upper run 38 of the belt, the rollers 32, 34 and 36 being parallel to and lying in substantially the same horizontal plane as the lower compressor roll 22 so that the upper run 38 of the belt 30 is substantially horizontal.

An upper bale-forming conveyor, indicated generally by the numeral 40, is also disposed between the opposite side panels 16 and includes a plurality of side-by-side elastic endless belts 42, which are transversely spaced a relatively small distance apart and extend across the width of the baling chamber. The belts 42 are trained around a transverse lower front roller 44, which extends between the opposite side panels rearwardly of the upper compressor roll 20, a transverse upper front roller 46 and a transverse upper rear roller 48, which also extend between the opposite side panels.

In this embodiment, the belts, 42, are required to extend to approximately twice their free length in order to accommodate a full sized bale. The initial length of the belts, installed, is slightly greater than their free length, the initial extension producing sufficient tension to hold the belts in place and enable them to track well on the rollers until the formation of a bale is begun and belt tension progressively increases. In addition to the necessary elongation property, the material used for the belts should preferably have good resistance to hysteresis, flex cracking, tearing and abrasion. A polyurethane elastomer having such properties is at present a preferred material and a preferred belt cross section is approximately 5 inches wide by ⅜ inch deep. The belts are provided with a laced joint (not shown in the drawings) so that belts may be installed and removed without disassembling the rollers 46, 48 etc. from the machine. At the joint, the belt ends are fabric reinforced to provide a secure attachment for the lacing.

An articulated rear gate assembly indicated generally by the numeral 50 allows rearward discharge of the formed bales. The gate assembly is pivoted to the main frame and includes a linkage, indicated generally by the numeral 52. The gate assembly is controlled by a pair of hydraulic cylinders 56 and is described in greater detail in U.S. Pat. No. 3,931,702.

A lower rear transverse roller 58 and a rear transverse roller 60 are carried by the gate assembly 50 and extend the full width of the bale chamber. The upper conveyor belts 42 are trained around rollers 58 and 60 as well as rollers 44, 46 and 48 and all five rollers engage the inner sides of the belts.

Figure 2:
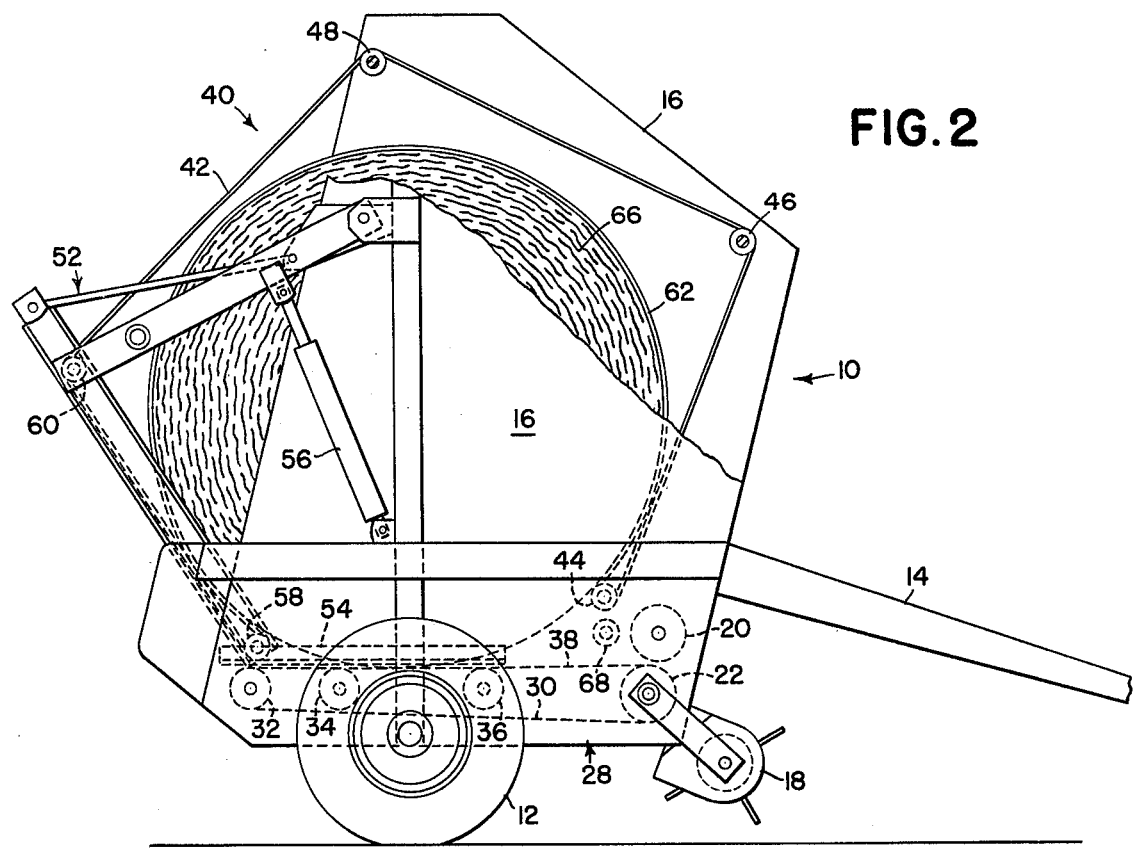
FIG. 2 is a view similar to FIG. 1, but with portions of the side of the machine removed to show more clearly the extended belts of the bale-forming conveyor as they engage the periphery of a fully formed bale just prior to discharge.

The upper run 38 of the lower conveyor is driven rearwardly during the baling process while the lower run of the upper conveyor, which is opposite the lower conveyor, is driven forwardly, the drive system also being described in said U.S. Pat. No. 3,931,702. The portion of the upper conveyor belts 42 extending between the lower rear roller 58 and the fixed lower front roller 44 is the bale-engaging portion 62 of the upper conveyor. The area or zone between the upper run 38 of the lower conveyor and the bale-engaging portion 62 of the upper conveyor defines a baling zone identified by the numeral 64 in FIG. 1. As is apparent from FIG. 1, as the compressor rolls 20 and 22 feed the mat of material into the baling zone 64, it is engaged by the two oppositely moving conveyors in such a manner that it starts to roll the material into a cylindrical bale 66, the bale 66 being shown early in its formation in FIG. 1 and near completion in FIG. 2. The rear roller 58 defines the rearward end of the baling zone 64, and as the bales grows, the gate assembly swings rearwardly carrying the lower rear roller 58 rearwardly until it reaches the position shown in FIG. 2. A transverse stripper roller 68 extends between the opposite side panels immediately to the rear of the upper compressor roller 20 and immediately below the lower front roller 44 to strip crop material from the upper conveyor belts at the forward end of the baling zone 64, the stripper roller 68 being driven in a counterclockwise direction as viewed in FIG. 1.

In operation, as the machine advances across a field of windrowed crops, the pickup mechanism 18 raises the windrow 24 and moves it rearwardly to the compressor rolls 20 and 22 which deliver the crop rearwardly in a mat to the baling zone 64 where it is engaged by the rearwardly moving upper run 38 of the lower conveyor and the forwardly moving run 62 of the upper conveyor as shown in FIG. 1. The oppositely moving belts tend to roll the hay into a cylinder and the stripper roller 68 prevents the upper conveyor from expelling the crop material forwardly over the upper compressor roll 20. As the size of the cylinder of hay in the baling zone increases, the bale is supported from below on the upper run 38 of the lower conveyor while the bale-engaging run 62 of the upper conveyor substantially engages the periphery of the remainder of the bale. The increasing bale size, of course, requires additional length of the bale-engaging run of the upper conveyor and the necessary belt length is provided by the elastic extension of the upper conveyor belts 42. As the belts extend to accommodate the growing bale, their tension increases which helps control bale shape and determine bale density.

As previously described, as the bale 66 grows, the roller 58 moves rearwardly to accommodate the increase in bale size, the cylinders 56 allowing free movement of the rear gate assembly. Once the bale reaches it full size, the operator actuates the cylinders 56 so that they swing the gate assembly rearwardly and upwardly providing clearance for the rearward discharge of the bale 66 (not shown). After the bale 66 clears the machine the operator retracts the cylinders 56 to move the gate assembly back to its original position as shown in FIG. 1 whereupon the elastic belts 42 of the upper conveyor resume their initial stretched length with their bale-engaging portion 62 directly spanning lower rollers 44 and 58 at the baling zone 64 in preparation for the inception of formation of another bale.

I claim:

1. In a mobile machine for forming large cylindrical bales of crop material including means for delivering a mat of crop material to a baling zone, the combination therewith of an improved bale-forming endless conveyor trained around a plurality of rollers and having a yieldable moving bale-engaging run spanning the baling zone and engageable with the mat or crop material for rolling the crop material into a generally cylindrical bale, said bale-engaging run substantially engaging the bale periphery and yielding to accommodate a growing bale during its formation, said yielding requiring that the effective length of the conveyor when engaging a fully formed bale be at least ten percent greater than the effective length at the inception of the formation of the bale and said conveyor comprising at least one endless elastic belt stretchable in length to provide said yielding.

2. The invention defined in claim 1 wherein the machine includes a lower conveyor having a substantially horizontal upper run disposed below the bale-engaging run of the bale-forming conveyor so as to form a floor for the baling zone.

3. The invention defined in claim 1 wherein the endless conveyor includes a plurality of side-by-side elastic belts.

4. The invention defined in claim 1 wherein the stretched length of the elastic belt when engaging a fully formed bale in the baling zone is approximately twice that of the belt at the inception of formation of a bale.

* * * * *